(12) United States Patent
Asturias et al.

(10) Patent No.: US 10,282,331 B1
(45) Date of Patent: May 7, 2019

(54) SYSTEM AND METHOD FOR COMMAND PROCESSING

(71) Applicant: Arista Networks, Inc., Santa Clara, CA (US)

(72) Inventors: Diego Alfredo Asturias, Mountain View, CA (US); Peter E. Rufer, Palo Alto, CA (US); Hua Zhong, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/905,220

(22) Filed: Feb. 26, 2018

(51) Int. Cl.
*G06F 13/362* (2006.01)
*H04L 29/08* (2006.01)
*G06F 13/24* (2006.01)

(52) U.S. Cl.
CPC ............ *G06F 13/362* (2013.01); *G06F 13/24* (2013.01); *H04L 67/141* (2013.01)

(58) Field of Classification Search
CPC .................................................... G06Q 10/10
See application file for complete search history.

(56) References Cited

U.S. PATENT DOCUMENTS

2016/0212026 A1* 7/2016 Mammen ................ H04L 43/08

\* cited by examiner

*Primary Examiner* — Henry Tsai
*Assistant Examiner* — Juanito C Borromeo
(74) *Attorney, Agent, or Firm* — Chamberlain, Hrdlicka, White, Williams & Aughtry

(57) ABSTRACT

A method and system for processing commands on a network device. The method may include instantiating a command execution back end that includes a parser, an activity thread, and a command execution server thread; receiving a connection; instantiating a command execution front end including a controlling terminal; detecting the instantiation of the command execution front end; creating a connection thread including an input communication channel, an output communication channel, an error communication channel, and a thread local working directory; receiving signal socket information, arguments socket information, connection environment information, a user identifier, a group identifier; a name of the controlling terminal, and a connection type; receiving additional command execution information; receiving a command; sending the command from the command execution front end to the connection thread; parsing the command using the parser; executing the parsed command to obtain a result; and providing the result to the command execution front end.

21 Claims, 4 Drawing Sheets

SYSTEM AND METHOD FOR COMMAND PROCESSING

BACKGROUND

Network devices often receive connections from entities seeking to execute commands on the network device. Such commands may, for example, be executed to obtain information about the network device, or change the state of the network device. However, each connection to a network device may require creation of a separate process, each loading various plug-ins and/or parsers, which may use significant amounts of network device resources (e.g., memory, processing, etc.) and/or contribute to extended start up time for the network device.

SUMMARY

In general, in one aspect, the invention relates to a method for processing commands on a network device. The method may include instantiating, on the network device, before receiving any command for execution, a command execution back end that includes a parser, an activity thread, and a command execution server thread; receiving a first connection to the network device; instantiating, on the network device and associated with the first connection, a first command execution front end that includes a first controlling terminal; detecting, by the command execution server thread, the instantiation of the first command execution front end; creating, by the command execution server thread, a first connection thread associated with the first command execution front end, the first connection thread including a first connection thread input communication channel, a first connection thread output communication channel, a first connection thread error communication channel, and a first connection thread local working directory; receiving, at the first connection thread from the first command execution front end, first connection signal socket information, first connection arguments socket information, first connection environment information; a first connection user identifier, a first connection group identifier; a first name of the first controlling terminal, and a first connection type; receiving, from the first command execution front end, based on the first connection type, first additional command execution information; receiving, at the first controlling terminal, a first command; sending the first command from the first command execution front end to the first connection thread; parsing the first command using the parser to obtain a first parsed command; executing the first parsed command to obtain a first result; and providing the first result to the first command execution front end.

In general, in one aspect, the invention relates to a non-transitory computer readable medium including instructions that, when executed by a processor, perform a method of accelerating monitoring of network traffic. The method may include instantiating, on the network device, before receiving any command for execution, a command execution back end that includes a parser, an activity thread, and a command execution server thread; receiving a first connection to the network device; instantiating, on the network device and associated with the first connection, a first command execution front end comprising a first controlling terminal; detecting, by the command execution server thread, the instantiation of the first command execution front end; creating, by the command execution server thread, a first connection thread associated with the first command execution front end, the first connection thread including a first connection thread input communication channel, a first connection thread output communication channel, a first connection thread error communication channel, and a first connection thread local working directory; receiving, at the first connection thread from the first command execution front end, first connection signal socket information, first connection arguments socket information, first connection environment information, a first connection user identifier, a first connection group identifier, a first name of the first controlling terminal, and a first connection type; receiving, from the first command execution front end, based on the first connection type, first additional command execution information; receiving, at the first controlling terminal, a first command; sending the first command from the first command execution front end to the first connection thread; parsing the first command using the parser to obtain a first parsed command; executing the first parsed command to obtain a first result; and providing the first result to the first command execution front end.

In general, in one aspect, the invention relates to a system for processing commands on a network device. The system may include the network device, including a processor, persistent storage, and memory, and configured to instantiate, before receiving any command for execution, a command execution back end that includes a parser, an activity thread, and a command execution server thread; receive a first connection; and instantiate, associated with the first connection, a first command execution front end comprising a first controlling terminal. The command execution back end may include a command execution server thread configured to detect the instantiation of the first command execution front end; create a first connection thread associated with the first command execution front end, the first connection thread including a first connection thread input communication channel, a first connection thread output communication channel, a first connection thread error communication channel, and a first connection thread local working directory; receive, at the first connection thread from the first command execution front end, first connection signal socket information, first connection arguments socket information, first connection environment information; a first connection user identifier, a first connection group identifier; a first name of the first controlling terminal, and a first connection type; receive, from the first command execution front end, based on the first connection type, first additional command execution information; parse a first command using the parser to obtain a first parsed command; execute the first parsed command to obtain a first result; and provide the first result to the first command execution front end. The command execution front end may be configured to receive, at the first controlling terminal, a first command; and send the first command from the first command execution front end to the first connection thread.

Other aspects of the invention will be apparent from the following description and the appended claims.

DETAILED DESCRIPTION

Figure 1:
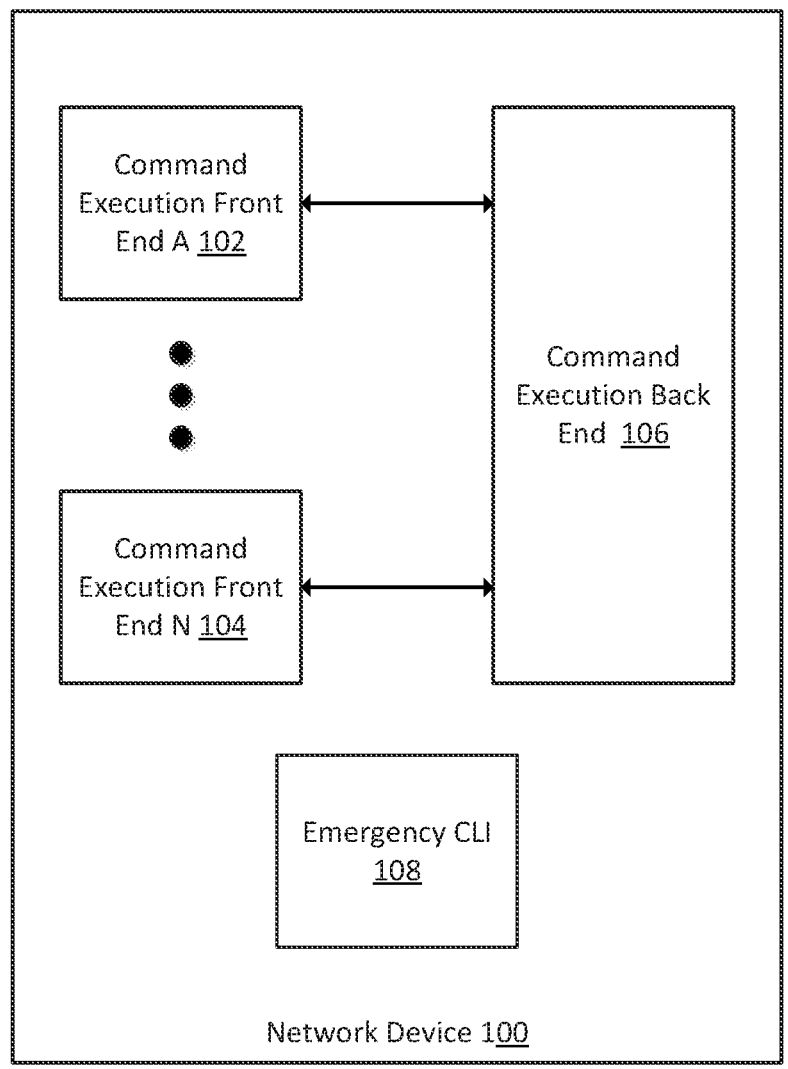
FIG. 1 shows a system in accordance with one or more embodiments of the invention.

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a system, method, and/or non-transitory computer readable medium for executing commands on a network device. Specifically, when a network device is started (e.g., powered on) or re-started, a command execution back end is started from a configuration file before or while the network device is initializing.

In one or more embodiments of the invention, in order to execute commands on a network device, an entity (e.g., a user, another application, etc.) may form a connection, directly or indirectly, to the network device. In one or more embodiments of the invention, a separate command execution front end is instantiated for each such connection. In one or more embodiments of the invention, each command execution front end communicates with the same command execution back end, which creates, via a command execution server thread, a separate connection thread for each command execution front end. In one or more embodiments of the invention, a variety of information is shared from the command execution front ends to their corresponding connection threads, and at least a portion of the information is based on the type of connection (e.g., non-interactive, interactive, programmatic, etc.). In one or more embodiments of the invention, when the command execution front end receives a command for execution, the command execution front end provides the command to its corresponding connection thread, where the command is parsed and executed, after which any result or error may be returned to the command execution front end.

In one or more embodiments of the invention, the command execution back end also includes a post fork handler. In one or more embodiments of the invention, a fork includes the creation of a new process to facilitate command execution. In one or more embodiments of the invention, the post fork handler facilitates and tracks the creation of execution stream forks in the event that the execution of a command within a connection thread requires forking.

FIG. 1 shows a system in accordance with one or more embodiments of the invention. As shown in FIG. 1, the system includes a network device (100). The network device (100) may include a command execution back end (106), any number of command execution front ends (e.g., command execution front end A (102), command execution front end N (104), etc.), and an emergency command line interface (CLI) (108). Each of these components is described below.

In one or more embodiments of the invention, a network device (100) may be a physical device that includes persistent storage (not shown), memory (e.g., random access memory (RAM), shared memory) (not shown), one or more processor(s) (e.g., integrated circuits such as, for example, a switch chip (not shown), a network data unit processor (not shown), etc.), and two or more physical network interfaces or ports (not shown). The switch chip (e.g., an application specific integrated circuit (ASIC)) or network data unit processor may be hardware that determines out of which egress port on the network device (100) to forward data units such as, for example, media access control (MAC) frames that may include Internet Protocol (IP) packets. The switch chip or network data unit processor may include egress and ingress ports that may connect to physical network interfaces or ports on the network device (100). Further, each physical network interface or port may or may not be connected to another component (e.g., a computing device (not shown)) or to another network device (not shown) in a network (not shown).

A network device (100) may be configured to receive data units via the network interfaces or ports, and determine whether to: (i) drop the data unit; (ii) process the data unit in accordance with one or more embodiments of the invention; and/or (iii) send the data unit, based on the processing, out another network interface or port on the network device (100) in accordance with one or more embodiments of the invention.

How the network device (100) makes the determination of whether to drop a network data unit, and/or send a network data unit to another component in the network device (100) or another device on the network may depend, in part, on whether the network device (100) is a layer-2 (L2) switch or a layer-3 (L3) switch (also referred to as a multilayer switch), which may perform at least some functions of a router. If the network device (100) is operating as a L2 switch, the network device (100) uses the destination MAC address along with a forwarding table or policy to determine out of which network interface or port to send the network data unit. If the network device (100) is operating as a L3 switch, the network device (100) uses the destination Internet Protocol (IP) address along with a routing table or policy to determine out of which network interface or port to send the network data unit, and includes the ability to write the MAC address of the next hop to receive the network data unit in place of its own MAC address (which, for example, the last hop or component in the network to send the network data unit may have written) in the L2 header information encapsulating the network data unit. If the network device (100) is a multilayer switch, the network device (100) includes functionality to process network packets using both MAC address and IP addresses.

In one embodiment of the disclosure, the persistent storage on a network device (100) may include any type of non-transitory computer readable medium that includes software instructions in the form of computer readable program code, which may be stored in whole or in part, and permanently or temporarily. Examples of the non-transitory computer readable medium include, but are not limited to, a CD, DVD, storage device, a diskette, a tape, flash memory, or physical memory. Further, when executed by the one or more computer processor(s), the software instructions enable the network device (100) to perform one or more embodiments of the disclosure described below (see e.g., FIG. 3). Examples of a network device (100) include, but are not limited to, a switch, a router, and a multilayer switch. Network devices are not limited to the aforementioned examples.

A network device (100) may also include any number of additional physical interfaces (not shown) which may or may not be used for the receipt and/or transmission of network data units (e.g., serial port, console port, auxiliary port, etc.). In one or more embodiments of the invention, any physical interface of a network device, whether or not used in the receipt and/or transmission of network data units, may be used to form at least part of a connection (e.g., a wired or wireless coupling) to the network device in order to allow the execution of commands on the network device.

In one or more embodiments of the invention, a network device command (e.g., a command line interface (CLI) command) is a pre-defined instruction that the network device (100) includes functionality to execute. The result of executing a command on a network device (100) may result in a state change (e.g., change in configuration of the network device, change in firmware executing on the network device, change in software executing on the network device (e.g., an operating system executing on the network device, applications executing on the network device, etc.)) and/or result in providing information about the state of the network device (or a portion thereof).

Examples of commands that provide information about the state of the network device may include, but are not limited to, a "show" command, such as "show vlan", which displays information about the virtual local area networks (VLANs) that are configured on the network device, "show mac address table", which displays the contents of the media access control (MAC) address table, and "show interfaces status", which displays details about the status of all interfaces.

Example commands that change the state of the network device may include, but are not limited to, the "interface" command, used to configure one or more interfaces on the network device, a "vlan" command, used to configure VLANs on the network device, and tan "ip route" command, used to configure static internet protocol (IP) routes on the network device. The invention is not limited to the aforementioned commands. Further, the functionality of a network device (100) is not limited to the aforementioned examples.

In one or more embodiments of the invention, the network device (100) includes a command execution back end (106).

In one or more embodiments of the invention, a command execution back end (106) is any hardware (e.g., circuitry), software, firmware, or any combination thereof that is included in a network device (100). As an example, a command execution back end may be a process (e.g., and executing instance of a software agent) that is started during network device initialization using a configuration file and that executes using memory, persistent storage, and one or more processors (including integrated circuitry of the processors) of the network device in order to perform at least a portion of the functionality described herein. Such functionality may include, but is not limited to, establishing separate execution threads (i.e., connection threads) for any number of command execution front ends (discussed below), and facilitating the execution of commands using the various execution threads and other components. Command execution back ends are discussed further in the description of FIG. 2, below.

In one or more embodiments of the invention, the network device (100) includes any number of command execution front ends (e.g., command execution front end A (102), command execution front end N (104)). In one or more embodiments of the invention, a command execution front end (102, 104) is any hardware (e.g., circuitry), software, firmware, or any combination thereof that is included in a network device (100). In one or more embodiments of the invention, a command execution front end (102, 104) is instantiated whenever a connection is made to a network device (100). In one or more embodiments of the invention, a separate command execution front end (102, 104) is instantiated for each connection to a network device that seeks to execute commands on the network device (100).

Such a connection may be made, at least in part, using any of the aforementioned types of physical interfaces of a network device (100). The connections (not shown) may be initiated by any entity (not shown) seeking to execute one or more commands on a network device. Examples of such entities include, but are not limited to, a user, a remote network device management application, a local network device management application, certain command line symbols (e.g., a Linux 'pipe'), etc. In one or more embodiments of the invention, a connection to a network device (100) may be a non-interactive connection, an interactive connection, or a connection facilitated, at least in part, by a an application programming interface (API). Connection types are not limited to the aforementioned examples. In one or more embodiments of the invention, a command execution front end may receive commands from local shells, terminals, remote processes, other software of the device, etc.

In one or more embodiments of the invention, a command execution front end (102, 104) includes functionality to communicate with the command execution back end. Such communication may occur to provide a variety of information (e.g., socket information, environment information, identifiers, controlling terminal information, user credentials, connection types, data structures to facilitate input, output, statistics, and/or error information related to command execution, etc.) to the command execution back end (106). Such information may be used, at least in part, to create a connection thread corresponding to the command execution front end that serves as an environment in which commands may be executed when received from the command execution front end. Connection threads are discussed further in the description of FIG. 2, below In one or more embodiments of the invention, the network device also include an emergency CLI (108). In one or more embodiments of the invention, an emergency CLI is hardware (e.g., circuitry), software, firmware, or any combination thereof, that includes functionality to facilitate the execution of commands on a network device (100). In one or more embodiments of the invention, the emergency CLI (108) is used as a backup execution mechanism when a connection to a network device seeking to execute one or more commands is unable to properly connect to the command execution back end.

While FIG. 1 shows a configuration of components, other configurations may be used without departing from the scope of the invention. For example, various components may be combined to create a single component. As another example, the functionality performed by a single component may be performed by two or more components. Accordingly, embodiments disclosed herein should not be limited to the configuration of components shown in FIG. 1.

Figure 2:
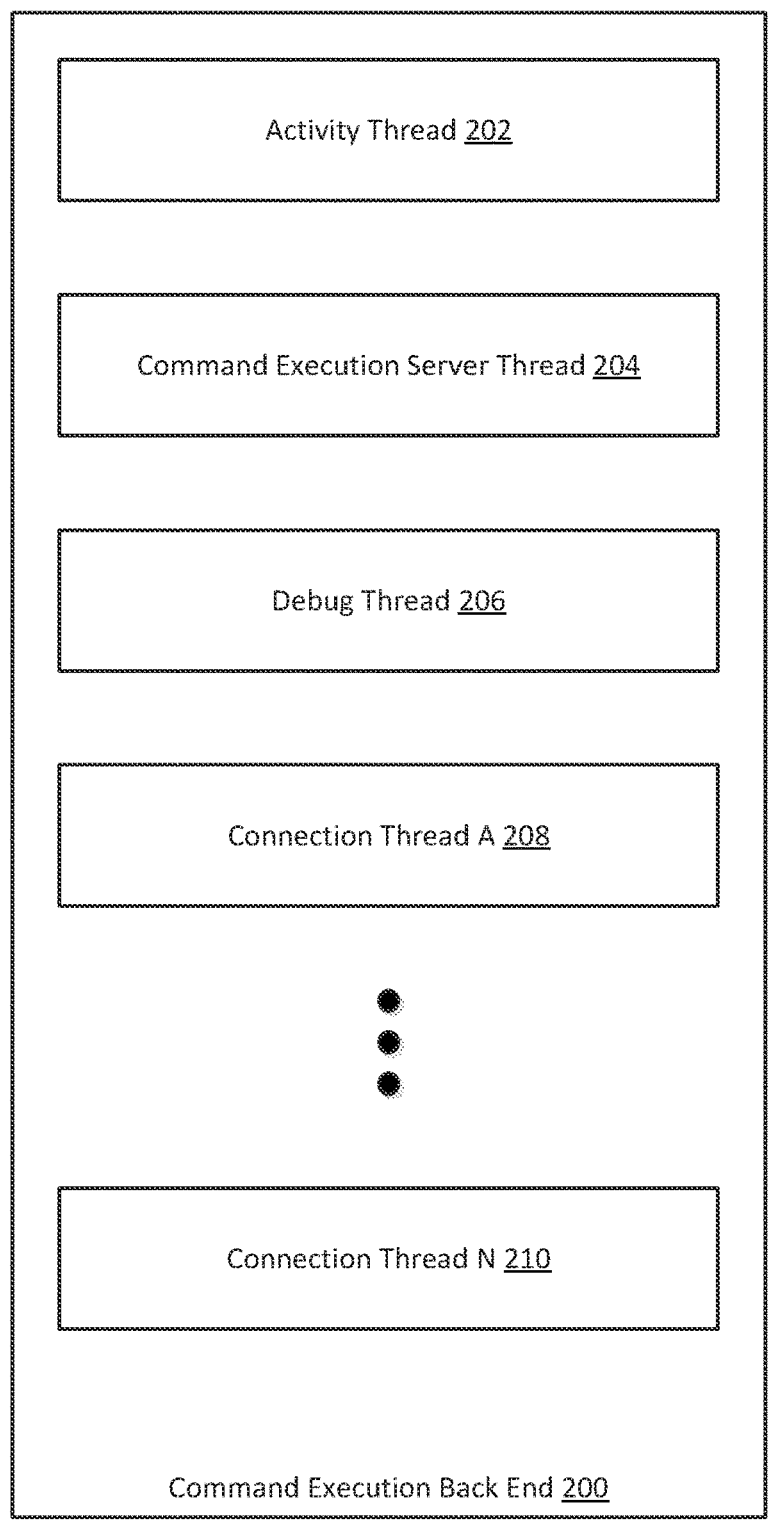
FIG. 2 shows a command execution back end in accordance with one or more embodiments of the invention.

FIG. 2 shows a command execution back end (200) in accordance with one or more embodiments of the invention. In one or more embodiments of the invention, a command execution back end (200) includes an activity thread (202), a command execution server thread (204) a debug thread (206) and any number of connection threads (e.g., connection thread A (208), connection thread N (210)). Each of these components is described below.

As discussed above in the description of command execution back end (106) of FIG. 1, in one or more embodiments of the invention, a command execution back end (200) is a process. In one or more embodiments of the invention, a network device (e.g., network device (100) of FIG. 1) includes an operating system. In one or more embodiments of the invention, a process is an instance of a computer program executing within the operating system of a network device using at least a portion of the physical resources of the network device (e.g., memory, persistent storage, one or more processors, etc.). In one or more embodiments of the invention, a process includes the resources required for execution of a computer program. As such, a process may include a memory (e.g., memory identified using a virtual address space), the executable code of the computer program, persistent storage space, etc. A process may have a unique process identifier (PID), a set of environment variables, associated security constraints, and/or any other resources required for program execution.

In one or more embodiments of the invention, the command execution back end (200) is a process that is initialized before or during the startup procedure of a network device from a configuration file. In one or more embodiments of the invention, a command execution back end (200) is initialized before or during initialization because it may be used to start other portions of the software and/or firmware that are required for network device operation. In one or more embodiments of the invention, initializing the command execution back end (200) includes loading any number or plug-ins (not shown) for facilitating execution of commands within connection threads (discussed below) of the command execution back end. At least a portion of such plug-ins may implement the ability to parse individual commands by providing parsing rules and command handlers (not shown) that are invoked when the rules are successfully parsed and, as such, may be referred to, at least in part, as a parser. In one or more embodiments of the invention, a parser performs a syntactic analysis on a string of symbols and/or characters that are intended as a command to be executed. In one or more embodiments of the invention, if a command is successfully parsed, the command may be executed (e.g., by the command handler (not shown)).

In one or more embodiments of the invention, the command execution back end (200) includes any number of threads. In one or more embodiments of the invention, a thread is an execution environment within a process for executing at least a portion of the functionality that the process is intended to execute. In one or more embodiments of the invention, the threads of a process share the resources provided within the process (e.g., memory, address space, etc.).

In one or more embodiments of the invention, the command execution back end includes an activity thread (202). In one or more embodiments of the invention, the activity thread (202) is the main thread of the command execution back end (200). The activity thread (202) may include functionality to communicate with a database (not shown) (e.g., Sysdb) in order to provide a local representation of relevant information from the database, as well as pushing local changes into the database and receiving updates from the database Additionally, the activity thread (202) may include functionality to manage locking mechanisms for thread synchronization. Such locking mechanisms may include an activity lock, which may be a lock implemented when a local representation (e.g., a copy) of a system database of a network device is being read from or written to by a thread, including the activity thread (e.g., in response to execution of a command in a connection thread (discussed below)), and/or a global interpreter lock for synchronization of thread execution within a process, or any other type of lock mechanism.

In one or more embodiments of the invention, the command execution back end (200) also includes a command execution server thread (204). In one or more embodiments of the invention, a command execution server thread (204) is a thread that includes functionality to detect a connection to a network device by an entity seeking to execute a command and/or an instantiation of a command execution front end corresponding to such a connection. In one or more embodiments of the invention, the command execution server thread (204) also includes functionality to create a connection thread (208, 210) within the command execution back end (200) for each detected command execution front end.

In one or more embodiments of the invention, the command execution back end (200) also includes a debug thread (206). In one or more embodiments of the invention, a debug thread (206) includes functionality to record information for use in debugging issues that may arise within the command execution back end (200). Such information may include, but is not limited to, a list of connection threads (208, 210) created by a command execution server thread (204), stack information related to the connection threads, information related to locks being used by the command execution back end (200) at a certain time, status relating to interrupts, etc.

In one or more embodiments of the invention, the command execution back end (200) also includes any number of connection threads (208, 210). As discussed above, a connection thread (208, 210) is created by the command execution server thread (204) each time a connection is made to a network device and a command execution front end is instantiated corresponding to the connection. In one or more embodiments of the invention, a connection thread (208, 210) includes anything required to execute a command sent from a command execution front end. As such, a connection thread may include a current mode, a prompt, thread local data structures for storing data (e.g., each connection thread has a separate current working directory that includes the root of a thread local file system), and a demultiplexing input communication channel, a demultiplexing output communication channel, a demultiplexing error communication channel, thread environment variables, a user identifier, a group identifier, a post fork handler for maintaining a list of forked child processes and/or threads, signal socket information (e.g., for facilitating received signals such as, for example, control+C for ending command execution), argument socket information, and/or any controlling terminal information for facilitating the execution of forks.

While FIG. 2 shows a configuration of components, other configurations may be used without departing from the scope of the invention. For example, various components may be combined to create a single component. As another example, the functionality performed by a single component may be performed by two or more components. Accordingly, embodiments disclosed herein should not be limited to the configuration of components shown in FIG. 2.

Figure 3:
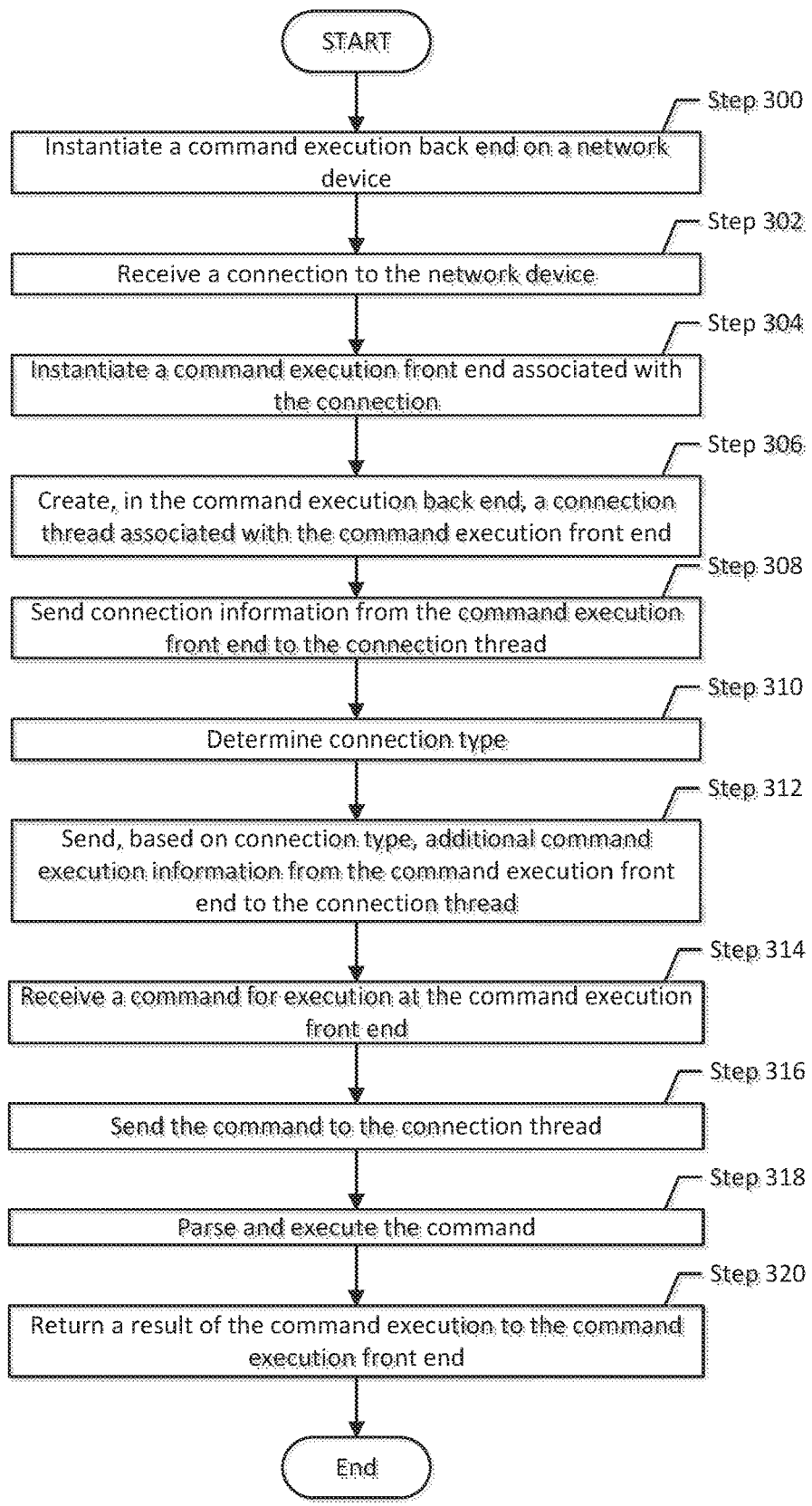
FIG. 3 shows a flowchart in accordance with one or more embodiments of the invention.

FIG. 3 shows a flowchart in accordance with one or more embodiments of the invention. While the various steps in the flowchart are presented and described sequentially, one of ordinary skill in the art and having the benefit of this Detailed Description will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3 shows a flowchart describing a method for executing commands on a network device in connection threads within a command execution back end process in accordance with one or more embodiments of the invention.

In Step 300, a command execution back end is instantiated on a network device. In one or more embodiments of the invention, the command execution back end is instantiated before or during initialization of the network device using a configuration file. In one or more embodiments of the invention, instantiating a command execution back end includes obtaining network device resources for use by the command execution back end, including memory addressed by memory addresses in an address space, and loading the instructions that make up the command execution back end program into such an address space. In one or more embodiments of the invention, instantiation of a command execution back end also includes loading of any number of plug-ins, at least a portion of which are used to implement a parser for parsing commands for execution on a network device.

In Step 302, a connection is received by a network device. In one or more embodiments of the invention, a connection may be a direct or indirect coupling between the network device and an entity seeking to execute one or more commands on the network device. As an example, a remote configuration application may be executing on a computing device, and, in order to execute one or more commands on a network device, may form a connection to the network device though the network to a physical interface of the network device that is used for processing network data units received by the network device. As another example, the network device may include a console port that may directly connected to by a computing device of a user via a certain cable (e.g., a serial cable) to access a CLI terminal on the network device.

In Step 304, a command execution front end is instantiated for the connection. In one or more embodiments of the invention, instantiating a command execution front end includes creating a process within an operating system of a network device that includes functionality to communicate with a command execution back end and also to receive any input (e.g., commands) provided via the connection from an entity seeking to execute one or more commands.

In Step 306, in response to the receipt of a connection and instantiation of a command execution front end, a command execution server thread of the command execution back end creates a connection thread associated with the command execution front end. In one or more embodiments of the invention, creating a connection thread includes provisioning resources of the command execution back end process (e.g., address space, storage (e.g., a working directory), parser information, etc.) for use by the connection thread, and assigning the connection thread a thread identifier. In one or more embodiments of the invention, the connection thread creation also includes creating for the connection thread an input communication channel (e.g., stdin), an output communication channel (e.g., stdout), and an error communication channel (e.g., stderr).

In Step 308, connection information is sent from the command execution front end to the connection thread. In one or more embodiments of the invention, such information includes signal socket information, argument socket information, environment information, a user identifier (e.g., for use in determining user permissions), a group identifier, information (e.g., a name) related to a controlling terminal, and a connection type. In one or more embodiments of the invention, the user identifier and the group identifier are each created for a connection thread via a system call.

In Step 310, the connection type of the connection for which the command execution front end was instantiated is determined based on the connection type information received from the command execution front end. For example, the connection type may be identified by a certain character, such as a letter. Examples of connection types include, but are not limited to, non-interactive (e.g., a Linux pipe), interactive (e.g., a CLI shell), and programmatic interface (e.g., Command API).

In Step 312, additional command execution information is sent from the command execution front end to the connection thread based on the connection type determined in Step 310.

In one or more embodiments of the invention, if the connection type is non-interactive, the additional information includes an input file descriptor for communicating via the input communication channel of the connection thread, an output filed descriptor for communicating via the output communication channel of the connection thread, and an error file descriptor for communicating via the error communication channel of the connection thread.

In one or more embodiments of the invention, if the connection type is interactive, the additional command execution information includes a pseudo terminal slave file descriptor for communication between the controlling terminal of the command execution front end and the input, output, and error communication channels of the connection thread. In one or more embodiments of the invention, if the connection type is interactive, the additional command execution information also includes request socket information for establishing a socket pair to facilitate receipt by the connection thread of requests for command execution, and additional input socket information for establishing an additional information socket pair for the connection thread to request additional information that may be required in order to execute a received command.

In one or more embodiments of the invention, if the connection type is a programmatic interface, the additional command execution information includes request socket information for communicating command execution requests (e.g., Java Script Object Notation (JSON) remote procedure calls (RPCs)), response socket information for communicating the results of executed commands from the connection thread to the command execution front end, and statistics socket information for communicating statistics information related to command execution (e.g., how many commands were executed via the programmatic interface connection).

In Step 314, a command for execution is received at a command execution front end. For example, a user may connect a computing device to a console port of a network device, start a CLI shell on the computing device, and type a command into the command line of the CLI shell, after which the command is sent to a controlling terminal of the command execution front end.

In Step 316, the command is sent to the connection thread. In one or more embodiments of the invention, if the connection type is non-interactive, the command is sent using the input file descriptor and the input communication stream of the connection thread. In one or more embodiments of the invention, if the connection type is interactive, the command is sent from the controlling terminal of the command execution front end to the input communication channel of the connection thread using the pseudo terminal slave file descriptor. In one or more embodiments of the invention, if the connection type is a programmatic interface, the command is sent to the connection thread via the request socket.

In Step 318, the command received in Step 314 is parsed and executed. In one or more embodiments of the invention, the parsing of the command is a syntactic check of the command to determine whether it may be executed. If the parsing is successful, the command may be executed, for example, to obtain information about the state of the network device (e.g., show ports), or to change the state of the network device (e.g., create new VLAN).

In one or more embodiments of the invention, the execution of a command may include one or more execution forks (e.g., creation of new process to facilitate command execution). In such embodiments, a post fork handler of the command execution back end may be informed of the fork, and provided with information related to the execution fork, such as the child thread identifiers, and the process identifier and thread identifier of the parent process and thread that created the fork. Additionally, a controlling terminal for the fork may be created to facilitate execution of the forked instruction stream.

In Step 320, the results of the command execution are returned to the command execution front end. In one or more embodiments of the invention, if the connection type is non-interactive, the results are sent using the output file descriptor and the output communication stream of the connection thread and/or the error file descriptor and the error communication stream of the connection thread. In one or more embodiments of the invention, if the connection type is interactive, the results are communicated to the controlling terminal of the command execution front end using the output or error communication channels of the connection thread and the pseudo terminal slave file descriptor. In one or more embodiments of the invention, if the connection type is a programmatic interface, the results are sent from the connection thread to the command execution front end using the response socket.

Figure 4:
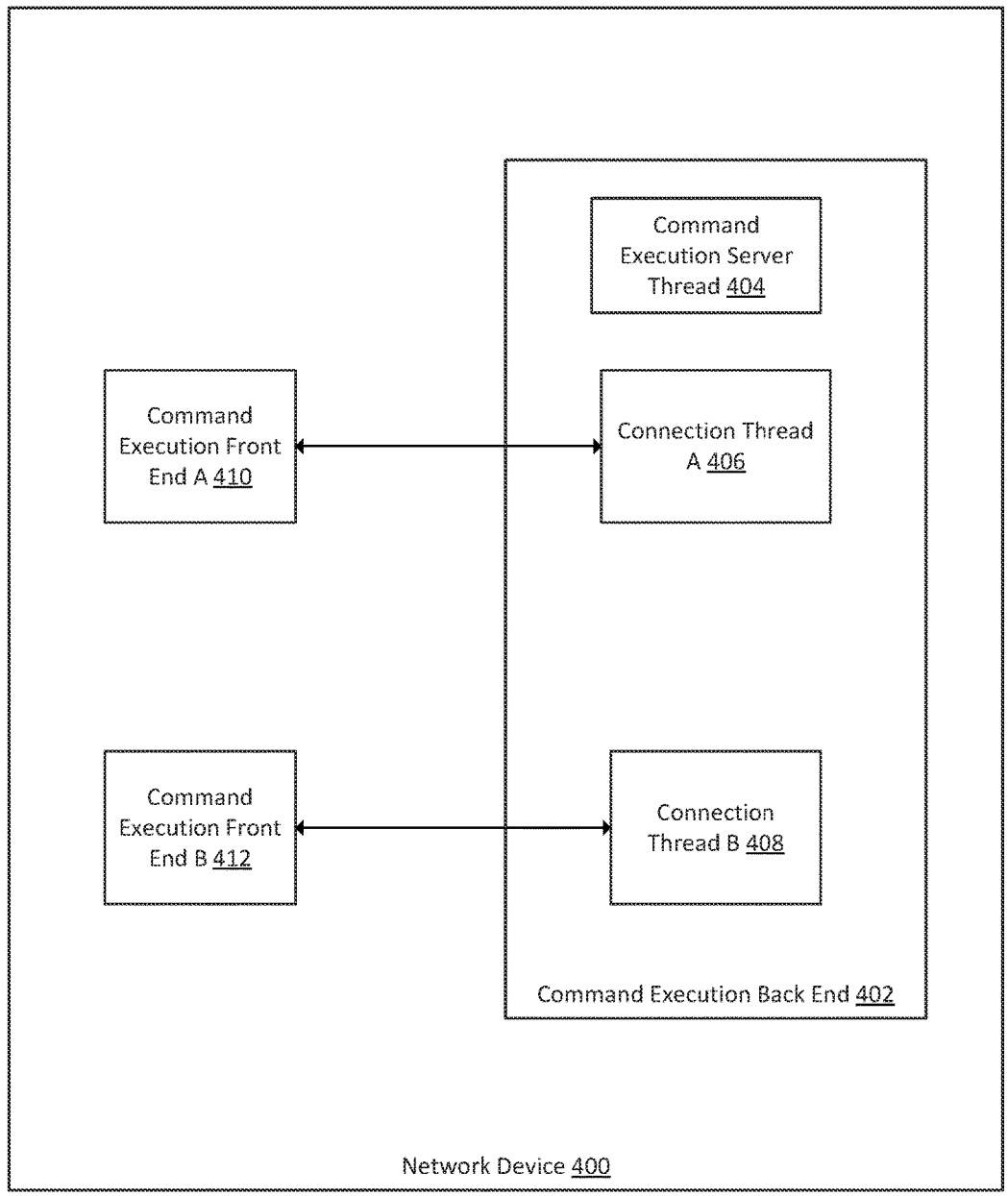
FIG. 4 shows an example in accordance with one or more embodiments of the invention.

FIG. 4 shows an example in accordance with one or more embodiments of the invention. The following example is for explanatory purposes only and not intended to limit the scope of the invention.

Referring to FIG. 4, consider a scenario in which a network device (400) has been started, and a command execution back end (200) has been initialized, including a command execution server thread (404). Additionally, two interactive connections have been made to the network device, causing the instantiation of command execution front end A (410) and command execution front end B (412). In response to the connections and instantiations of the command execution front ends, the command execution server thread has created connection thread A (406) for command execution front end A (410), and connection thread B (408) for command execution front end B (412), and otherwise continues to listen for new connections and command front end instantiations.

In such a scenario, a user of the connection corresponding to command execution frond end A (410) and a user of the connection corresponding to command execution frond end B (412) each seek to execute a command on the network device. To facilitate the execution of the two commands, each front end creates a signal socket pair and an argument socket pair.

Next, the command execution front ends (410, 412) send to their respective connection threads (406, 408) signal socket information, argument socket information, environment information, a user identifier, a group identifier, a pseudo terminal slave file descriptor associated with a controlling terminal of the command execution front end, request socket information, and additional input socket information.

Next, a CLI session object is created for each connection thread, resulting in the instantiation in the connection thread of the mode corresponding to the command execution front end, and an instantiation of the parser provided within the command execution back end (402).

Next, each user enters a command for execution, which is passed to the connection thread via a socket.

Once the command is received, the command is parsed within the connection thread using the parser, and an appropriate command handler is obtained in order to execute the command. The command is then executed using the command handler.

Connection thread A (406) receives a 'show version' command seeking the model number, serial number, and system MAC address of the network device. The execution of the command is successful. Therefore, the requested information is provided from the output communication channel of connection thread A (406) to the controlling terminal of command execution front end A (410) via the pseudo slave terminal, and then to the user that entered the command.

Connection thread B (408) receives a 'show mdolue' command seeking the supervisor, fabric, and linecard modules in a modular network device, including model number, serial number, hardware version number, software version (supervisors only), MAC address (supervisors and linecards), and operational status. Due to the misspelling of the word 'module', the execution of the command results in an error. Therefore, error information is provided to the controlling terminal of command execution front end B (412) via the pseudo slave terminal, and then to the user that entered the command.

One having ordinary skill in the art and the benefit of this Detailed Description will appreciate that embodiments of the invention facilitates execution of CLI commands within threads of a single process which reduces the overhead associated with the creation of a new process each time a connection is made to a network device seeking to execute one or more commands.

Additionally, one having ordinary skill in the art and the benefit of this Detailed Description will appreciate that each connection (including command execution front end and corresponding connection thread) is unaware that it runs in a thread rather than a process, as all the necessary requirements for command execution are provided on a per thread basis, as are all features that may come with running in a process (e.g., file access based on operating system permission, the possibility of interruption via commands using an interruption command such as 'control-c', non-daemonized processes killed on shell exit, etc.), which may be referred to as process features. This means, for example, that various commands which normally have a per process scope, or assume that all threads of a process have the same user, are possible because all requirements are provided within each connection thread, which may make it unnecessary to use any special purpose application programming interfaces to implement such commands. For a connection to be unaware of running in a thread rather than a process may require adherence to certain guidelines, such as avoidance of global variable declarations and instead using per-session-object variable declarations.

Additionally, one having ordinary skill in the art and the benefit of this Detailed Description will appreciate that, in modern systems using a Unix based operating system (e.g., Linux), when a connection is made to a device on its management port, the connecting entity will interface with a shell process over which the device may be managed via a command-line. Thus, the more connections that are made, the more such processes are needed, which may incur costs of memory and/or setup time.

In embodiments of the present invention, the memory cost and/or setup time may be dramatically reduced by using a single process where each previous shell process is now merely a thread in the aforementioned single process, which is performed in such a way that the previous shell process code is not aware that it now shares a process space with others. In one or more embodiments of the invention, the aggregation of more than one previous processes into a single process is performed via various means of mocking (e.g., the mocking of fd, signals, etc.) and usage of a unix-domain-socket feature that allows processes to share a file descriptor.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for processing commands on a network device, the method comprising:
   instantiating, on the network device, before receiving any command for execution, a command execution back end comprising a parser, an activity thread, and a command execution server thread;
   receiving a first connection to the network device;
   instantiating, on the network device and associated with the first connection, a first command execution front end comprising a first controlling terminal;
   detecting, by the command execution server thread, the instantiation of the first command execution front end;
   creating, by the command execution server thread, a first connection thread associated with the first command execution front end, the first connection thread comprising a first connection thread input communication channel, a first connection thread output communication channel, a first connection thread error communication channel, and a first connection thread local working directory;
   receiving, at the first connection thread from the first command execution front end, first connection signal socket information, first connection arguments socket information, first connection environment information; a first connection user identifier, a first connection group identifier, a first name of the first controlling terminal, and a first connection type;
   receiving, from the first command execution front end, based on the first connection type, first additional command execution information;
   receiving, at the first controlling terminal, a first command;
   sending the first command from the first command execution front end to the first connection thread;
   parsing the first command using the parser to obtain a first parsed command;
   executing the first parsed command to obtain a first result; and
   providing the first result to the first command execution front end.

2. The method of claim 1, wherein the connection type is a non-interactive connection type, and wherein the additional command execution information comprises an input file descriptor, an output file descriptor, and an error file descriptor.

3. The method of claim 1, wherein the connection type is an interactive connection type, and wherein the additional command execution information comprises a pseudo terminal slave file descriptor, request socket information, and additional input socket information.

4. The method of claim 1, wherein the connection type is a programmatic interface, and wherein the additional command execution information comprises response socket information, request socket information, and statistics socket information.

5. The method of claim 1, wherein the first connection thread has access to process features comprising operating system permission-based file access, interruption via an interruption command, and non-daemonized processes being ended upon a connection thread exit.

6. The method of claim 1, wherein the command execution back end further comprises a post fork handler, and wherein the method further comprises:
   determining that the first command requires a fork;
   calling, in response to the determination, the post fork handler;
   creating a child thread for the fork;
   setting, by the post fork handler, a child thread controlling terminal for the child thread;
   storing a parent process identifier, and a thread identifier of the first connection thread related to the child thread; and storing, by the command execution thread, the child thread identifier.

7. The method of claim 1, wherein the user identifier and the group identifier are each created for the first connection thread via a system call.

8. The method of claim 1, further comprising:
receiving a second connection to the network device;
instantiating, on the network device, a second command execution front end comprising a second controlling terminal;
connecting the second command execution front end to the command execution server thread;
creating, by the command execution server thread, a second connection thread associated with the second command execution front end, the second connection thread comprising a second connection thread input communication channel, a second connection thread output communication channel, a second connection thread error communication channel, and a second connection thread local working directory;
receiving, at the second connection thread from the second command execution front end, second connection signal socket information, second connection arguments socket information, second connection environment information;
a second user identifier, a second group identifier; a second name of the second controlling terminal; and a second connection type;
receiving, from the second command execution front end, based on the second connection type, second additional command execution information;
receiving, at the second controlling terminal, a second command;
sending the second command from the second command execution front end to the second connection thread;
parsing the second command using the parser to obtain a second parsed command;
executing the second parsed command to obtain a second result; and
providing the second result to the second command execution front end.

9. A non-transitory computer readable medium comprising instructions that, when executed by a processor, perform a method of accelerating monitoring of network traffic, the method comprising:
instantiating, on the network device, before receiving any command for execution, a command execution back end comprising a parser, an activity thread, and a command execution server thread;
receiving a first connection to the network device;
instantiating, on the network device and associated with the first connection, a first command execution front end comprising a first controlling terminal;
detecting, by the command execution server thread, the instantiation of the first command execution front end;
creating, by the command execution server thread, a first connection thread associated with the first command execution front end, the first connection thread comprising a first connection thread input communication channel, a first connection thread output communication channel, a first connection thread error communication channel, and a first connection thread local working directory;
receiving, at the first connection thread from the first command execution front end, first connection signal socket information, first connection arguments socket information, first connection environment information,
a first connection user identifier, a first connection group identifier, a first name of the first controlling terminal, and a first connection type;
receiving, from the first command execution front end, based on the first connection type, first additional command execution information;
receiving, at the first controlling terminal, a first command;
sending the first command from the first command execution front end to the first connection thread;
parsing the first command using the parser to obtain a first parsed command;
executing the first parsed command to obtain a first result; and
providing the first result to the first command execution front end.

10. The non-transitory computer readable medium of claim 9, wherein the connection type is a non-interactive connection type, and wherein the additional command execution information comprises an input file descriptor, an output file descriptor, and an error file descriptor.

11. The non-transitory computer readable medium of claim 9, wherein the connection type is an interactive connection type, and wherein the additional command execution information comprises a pseudo terminal slave file descriptor, request socket information, and additional input socket information.

12. The non-transitory computer readable medium of claim 9, wherein the connection type is a programmatic interface, and wherein the additional command execution information comprises response socket information, request socket information, and statistics socket information.

13. The non-transitory computer readable medium of claim 9, wherein the command execution back end further comprises a post fork handler, and wherein the method further comprises:
determining that the first command requires a fork;
calling, in response to the determination, the post fork handler;
creating a child thread for the fork;
setting, by the post fork handler, a child thread controlling terminal for the child thread;
storing a parent process identifier, and a thread identifier of the first connection thread related to the child thread; and
storing, by the command execution thread, the child thread identifier.

14. The non-transitory computer readable medium of claim 9, wherein the user identifier and the group identifier are each created for the first connection thread via a system call.

15. The non-transitory computer readable medium of claim 9, the method further comprising:
receiving a second connection to the network device;
instantiating, on the network device, a second command execution front end comprising a second controlling terminal;
connecting the second command execution front end to the command execution server thread;
creating, by the command execution server thread, a second connection thread associated with the second command execution front end, the second connection thread comprising a second connection thread input communication channel, a second connection thread output communication channel, a second connection thread error communication channel, and a second connection thread local working directory;

receiving, at the second connection thread from the second command execution front end, second connection signal socket information, second connection arguments socket information, second connection environment information, a second user identifier, a second group identifier; a second name of the second controlling terminal; and a second connection type;

receiving, from the second command execution front end, based on the second connection type, second additional command execution information;

receiving, at the second controlling terminal, a second command;

sending the second command from the second command execution front end to the second connection thread;

parsing the second command using the parser to obtain a second parsed command;

executing the second parsed command to obtain a second result; and providing the second result to the second command execution front end.

16. A system for processing commands on a network device, the system comprising:
the network device, comprising a processor, persistent storage, and memory, and configured to:
instantiate, before receiving any command for execution, a command execution back end comprising a parser, an activity thread, and a command execution server thread;
receive a first connection; and;
instantiate, associated with the first connection, a first command execution front end comprising a first controlling terminal;
the command execution back end comprising a command execution server thread configured to:
detect the instantiation of the first command execution front end;
create a first connection thread associated with the first command execution front end, the first connection thread comprising a first connection thread input communication channel, a first connection thread output communication channel, a first connection thread error communication channel, and a first connection thread local working directory;
receive, at the first connection thread from the first command execution front end, first connection signal socket information, first connection arguments socket information, first connection environment information; a first connection user identifier, a first connection group identifier; a first name of the first controlling terminal, and a first connection type;
receive, from the first command execution front end, based on the first connection type, first additional command execution information;
parse a first command using the parser to obtain a first parsed command;
execute the first parsed command to obtain a first result; and
provide the first result to the first command execution front end; and
the command execution front end configured to:
receive, at the first controlling terminal, a first command; and
send the first command from the first command execution front end to the first connection thread.

17. The system of claim 16, wherein the connection type is a non-interactive connection type, and wherein the additional command execution information comprises an input file descriptor, an output file descriptor, and an error file descriptor.

18. The system of claim 16, wherein the connection type is an interactive connection type, and wherein the additional command execution information comprises a pseudo terminal slave file descriptor, request socket information, and additional input socket information.

19. The system of claim 16, wherein the connection type is a programmatic interface, and wherein the additional command execution information comprises response socket information, request socket information, and statistics socket information.

20. The system of claim 16, wherein the command execution back end further comprises a post fork handler, and wherein the first connection thread is configured to:
determine that the first command requires a fork;
call, in response to the determination, the post fork handler;
create a child thread for the fork;
set, by the post fork handler, a child thread controlling terminal for the child thread;
store a parent process identifier, and a thread identifier of the first connection thread related to the child thread; and
store, by the command execution thread, the child thread identifier.

21. The system of claim 16,
wherein the network device is further configured to:
receive a second connection;
instantiate, on the network device, a second command execution front end comprising a second controlling terminal; and
connect the second command execution front end to the command execution server thread;
wherein the command execution back end is further configured to:
create, by the command execution server thread, a second connection thread associated with the second command execution front end, the second connection thread comprising a second connection thread input communication channel, a second connection thread output communication channel, a second connection thread error communication channel, and a second connection thread local working directory;
receive, at the second connection thread from the second command execution front end, second connection signal socket information, second connection arguments socket information, second connection environment information; a second user identifier, a second group identifier; a second name of the second controlling terminal; and a second connection type;
receive, from the second command execution front end, based on the second connection type, second additional command execution information;
parse the second command using the parser to obtain a second parsed command;
execute the second parsed command to obtain a second result; and
provide the second result to the second command execution front end; and
wherein the command execution front end is further configured to:
receive, at the second controlling terminal, a second command;

send the second command from the second command execution front end to the second connection thread.

\* \* \* \* \*